(12) United States Patent
Shiigi

(10) Patent No.: US 7,516,183 B2
(45) Date of Patent: Apr. 7, 2009

(54) METHOD AND SYSTEM FOR CREATING AND SENDING HANDWRITTEN OR HANDDRAWN MESSAGES VIA MOBILE DEVICES

(76) Inventor: Clyde Shiigi, 1585 Kapiolani Blvd., Suite 1800, Honolulu, HI (US) 96814

( * ) Notice: Subject to any disclaimer, the term of this patent is extended or adjusted under 35 U.S.C. 154(b) by 0 days.

(21) Appl. No.: 10/891,389

(22) Filed: Jul. 12, 2004

(65) Prior Publication Data
US 2004/0249899 A1    Dec. 9, 2004

(51) Int. Cl.
*G06F 13/00*    (2006.01)
(52) U.S. Cl. .................. 709/206; 709/219; 709/250
(58) Field of Classification Search .......... 709/206, 709/219, 246, 250, 217; 719/328, 329
See application file for complete search history.

(56) References Cited

U.S. PATENT DOCUMENTS

| | | | |
|---|---|---|---|
| 5,418,713 A | | 5/1995 | Allen |
| 5,426,594 A | * | 6/1995 | Wright et al. ............... 709/206 |
| 5,546,538 A | * | 8/1996 | Cobbley et al. ............. 709/203 |
| 5,546,539 A | | 8/1996 | Poling |
| 5,726,669 A | * | 3/1998 | Obata et al. ................... 345/2.2 |
| 5,818,447 A | * | 10/1998 | Wolf et al. ................... 345/752 |
| 5,862,330 A | * | 1/1999 | Anupam et al. ............. 709/204 |
| 5,880,740 A | * | 3/1999 | Halliday et al. ............. 345/629 |
| 5,959,260 A | * | 9/1999 | Hoghooghi et al. ...... 178/18.03 |
| 5,960,412 A | | 9/1999 | Tackbary et al. |
| 5,983,200 A | * | 11/1999 | Slotznick ..................... 705/26 |
| 6,003,007 A | * | 12/1999 | DiRienzo ....................... 705/4 |
| 6,054,990 A | * | 4/2000 | Tran ........................... 345/863 |

(Continued)

FOREIGN PATENT DOCUMENTS

EP    0784349 A    *    7/1997

(Continued)

OTHER PUBLICATIONS

Lotus White Paper, "Real Time Collaboration Standards", dated Oct. 1999, Lotus Development Corp.

*Primary Examiner*—Viet Vu
(74) *Attorney, Agent, or Firm*—Amin, Turocy & Calvin, LLP

(57) ABSTRACT

A handwritten or handdrawing messaging system employs a handwriting messaging component operable with a messaging client of a mobile device connected to the data transmission network to set up a handwriting data capture area in the messaging client into which the user can enter handwritten or handdrawn input through a suitable manual input device, and then operates to capture the handwritten or handdrawn input and send it as a handwritten electronic message to the intended recipient. It also sets up a graphical data viewing area within the messaging client for viewing handwritten electronic messages sent to the user. Preferably, it is a small-footprint software module installed with the messaging client of the mobile device. The mobile device can be any type of wired or wirelessly-connected portable device operating on a computing platform, such as a personal digital assistant (PDA) device, game console or player device, or other mobile messaging device. The manual input device can be a touch-sensitive screen, tablet with pen input, stylus pad with stylus input, or an attached drawing pad. The system is particularly useful for messaging via mobile game player devices, so that people all over the world can send handwritten messages, chat, and play handdrawn games with each other.

20 Claims, 15 Drawing Sheets

U.S. PATENT DOCUMENTS

| | | | |
|---|---|---|---|
| 6,105,055 A * | 8/2000 | Pizano et al. | 709/204 |
| 6,133,905 A * | 10/2000 | Edo et al. | 345/156 |
| 6,198,809 B1 * | 3/2001 | Disanto et al. | 379/93.23 |
| 6,212,535 B1 * | 4/2001 | Weikart et al. | 715/513 |
| 6,360,252 B1 * | 3/2002 | Rudy et al. | 709/206 |
| 6,396,481 B1 * | 5/2002 | Challa et al. | 345/169 |
| 6,556,586 B1 * | 4/2003 | Sipila | 370/469 |
| 6,557,029 B2 * | 4/2003 | Szymansky | 709/206 |
| 6,985,169 B1 * | 1/2006 | Deng et al. | 348/61 |
| 7,003,308 B1 * | 2/2006 | Fuoss et al. | 455/466 |
| 2002/0099788 A1 * | 7/2002 | Szymansky | 709/217 |
| 2003/0063067 A1 * | 4/2003 | Chuang | 345/156 |

FOREIGN PATENT DOCUMENTS

| | | | |
|---|---|---|---|
| GB | 2289555 A | * | 11/1995 |
| GB | 2308523 | * | 6/1997 |
| JP | 400124178 | * | 5/1998 |
| JP | 410124178 | | 5/1998 |
| JP | 410260920 | * | 9/1998 |
| JP | HEI 10-260920 | | 9/1998 |
| JP | HEI 11-259930 | | 9/1999 |
| WO | WO 9704578 A | * | 2/1997 |
| WO | WO 0002149 | * | 1/2000 |

* cited by examiner

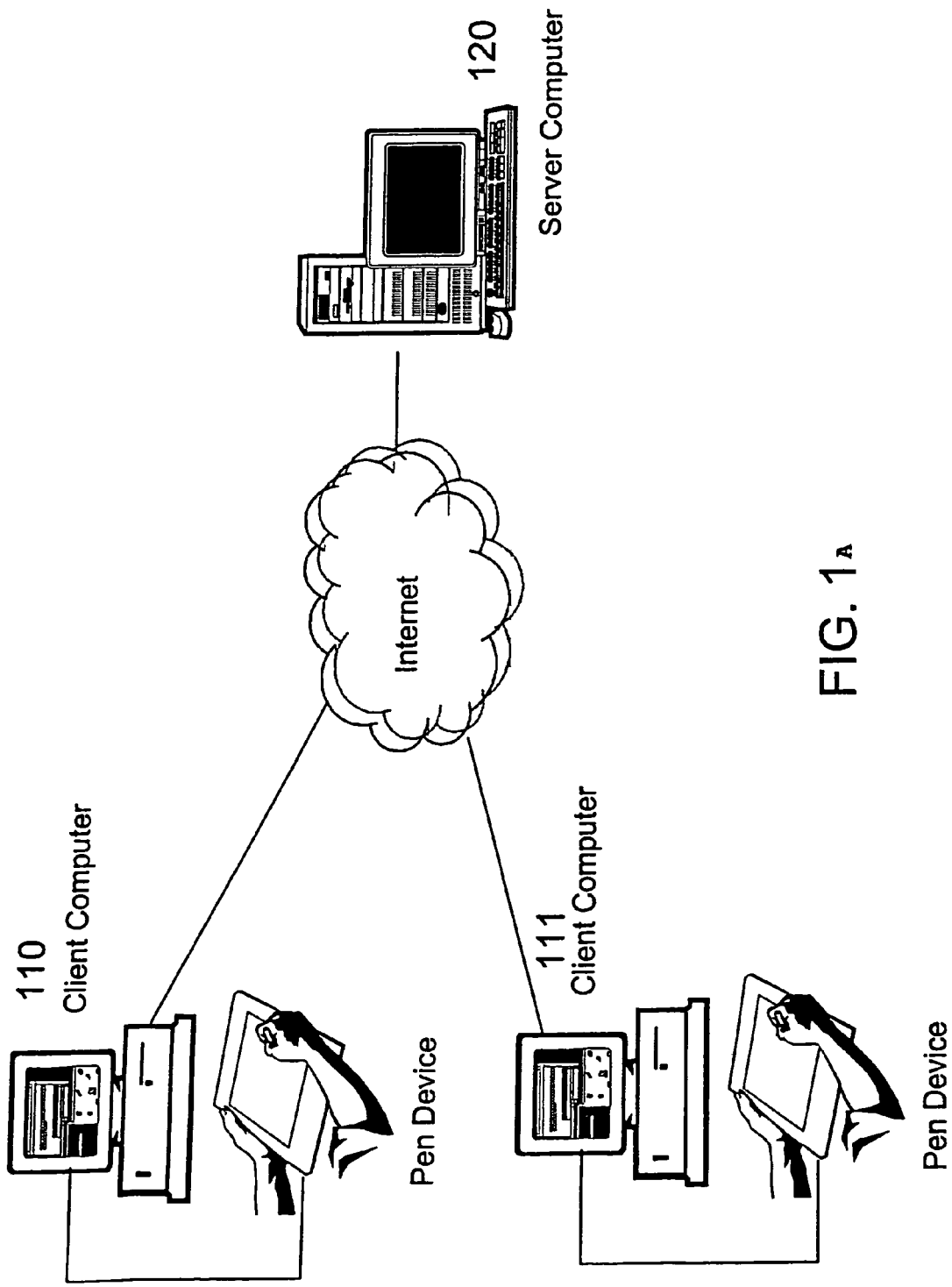

Handwriting Client and Handwriting Server Version

Handwriting Client and Handwriting Server Version

Handwriting Applet and Domino Server Version

Handwriting Client and Domino Server Version

Handwriting Applet and Real Time Server Version

Handwriting Client and Real Time Server Version

Handwriting Applet and Mail Server Version (Handwriting Client and Wireless Internet Email)

MMS Handwriting Messaging Version

MMS Handwriting Messaging Version

METHOD AND SYSTEM FOR CREATING AND SENDING HANDWRITTEN OR HANDDRAWN MESSAGES VIA MOBILE DEVICES

This U.S. patent application claims the priority of U.S. patent application Ser. No. 10/436,722, filed on May 12, 2003, now issued as U.S. Pat. No. 6,763,373 on Jul. 13, 2004, which was a continuation-in-part of U.S. patent application Ser. No. 09/978,472, filed on Oct. 15, 2001, entitled "Method and System for Creating and Sending Handwritten Message", issued as U.S. Pat. No. 6,564,249 on May 13, 2003, which was a continuation-in-part of U.S. patent application Ser. No. 09/687,351, filed on Oct. 11, 2000, entitled "Method and System for Creating and Sending Graphical Email", issued as U.S. Pat. No. 6,304,898 on Oct. 16, 2001, which claimed the priority of U.S. Provisional Application 60/159,636 filed on Oct. 13, 1999, entitled "Graphical Email Drawing and File Attachment System", all by the same inventor.

FIELD OF THE INVENTION

This invention relates to the processing of handwritten input in electronic messaging, and specifically to an electronic messaging system for sending and receiving handwritten or handdrawn messages via mobile devices.

BACKGROUND OF THE INVENTION

Electronic messaging is a general method for sending and receiving communications as digital data between computers on a network. The Internet has dramatically increased electronic messaging amongst millions of users on global data networks. Many different forms of electronic messaging are being used to send and receive communications in a wide variety of forms of structured and unstructured data. Businesses make extensive use of electronic messaging to conduct business communications and transactions between trading partners. Electronic mail (or email) is a popular form of electronic messaging for communications between users. Typical email messages are composed of typed text or a combination of typed text and text or graphical files that are attached to the email message and opened with the appropriate processor or viewer. As the popularity of the Internet continues to grow worldwide, more and more people numbering in the billions are expected to use email for communications.

Recent advances in technology and standards have expanded the types and forms of devices that can connect to the Internet. In addition to dial-up and online connections between users computers and servers that provide information services and email services, many types of other devices are being connected to the Internet for communications purposes, including personal digital assistants (PDAs), text messaging pagers, digital cellphones enabled with Wireless Application Protocol (WAP), advanced digital game machines, digital set top boxes for televisions, and even CPU-controlled household appliances. Many of these devices having Internet access do not require or are not adapted to use a keyboard for inputting data. While there are other types of input devices that enable handwritten or handdrawn input, such as touch sensitive screens, stylus pads, optical pens, etc., they have not been enabled for electronic messaging and other communication functions.

Handwritten or handdrawn input can be more convenient to use than a keyboard and, in many situations, would be uniquely necessary for certain types of communication. Many written language systems, such as Japanese, Korean, Chinese, Arabic, That, Sanskrit, etc., use cursive or ideographic characters that are very difficult to input by an equivalent method via keyboard. For example, text input of the Japanese written language requires the use of simulated phonetic spelling methods (romanji, hiragana, and/or katakana) to select from thousands of possible kanji characters. Many mobile devices such as PDAs do not have keyboards due to their limited size and form, or would become cumbersome to use if a keyboard must be attached or if text must be entered by cursoring through displays of softkeys. Disabled or hospitalized people who have limited hand mobility may not be able to use a keyboard effectively. Current legal and financial institutions still rely heavily on the use of handwritten signatures to validate a person's unique identity. And in many instances, people find it much easier to communicate an idea by drawing a picture, or prefer handwriting or drawing a picture as more personal or expressive communication than typing text on a keyboard.

There is thus a clear need for an electronic messaging system that allows people to communicate with their own handwriting or drawing, as contrasted to typed text. This need will continue to grow as the numbers of global users and Internet-connected devices increase. None of the current electronic messaging methods allow a user to compose, manipulate, store, send, receive, and view a handwritten or handdrawn email message.

SUMMARY OF THE INVENTION

In accordance with the present invention, an electronic messaging system, and related method, comprises a server component operable on a server computer connected to a data transmission network for receiving a handwritten message in electronic format sent from a user and delivering it to a recipient to whom it is addressed, and a handwriting messaging component operable with a messaging client of a mobile device having a connection to the data transmission network, wherein said handwriting messaging component sets up a handwriting data capture area within said messaging client into which the user can enter handwritten or handdrawn input through a suitable manual input device, and said handwriting data capture area operates to capture the handwritten or handdrawn input as graphical data and send it as a message in electronic format on the data transmission network to the server component for handling and delivery of the handwritten electronic message to the addressed recipient. The handwriting messaging component is also operable for setting up a graphical data viewing area within the messaging client of the mobile device for viewing the graphical data sent as a handwritten electronic message to the user.

In a preferred embodiment, the handwriting messaging component is a small-footprint software module installed with the messaging client of the mobile device. The mobile device can be any type of wired or wirelessly-connected portable device operating on a computing platform, such as a personal digital assistant (PDA) device, game console or player device, or messaging device. The manual input device can be a touch-sensitive screen, tablet device with pen input, stylus pad with stylus input, or an attached drawing pad. Preferably, the handwriting messaging component sets up the handwriting data capture area as a drawing editor/viewer on a touch-sensitive display screen of the mobile device that allows the user to compose, manipulate, and view handwritten or handdrawn messages by directly writing thereon. The editor/viewer can include standard drawing tools such as those for drawing line size, color, background image as a markup image, wallpapers, stationary styles, border selections, circle and polygon shapes, paintbrush, spray paint, flood fill, color palette, undo, scrolling, and/or other drawing/editor functions.

Other objects, features, and advantages of the present invention will be described in further detail below, with reference to the following drawings:

BRIEF DESCRIPTION OF DRAWINGS

FIG. 1A is a diagram illustrating the connection of client computers with pen devices to an email server computer on the Internet.

DETAILED DESCRIPTION OF INVENTION

Figure 1B:
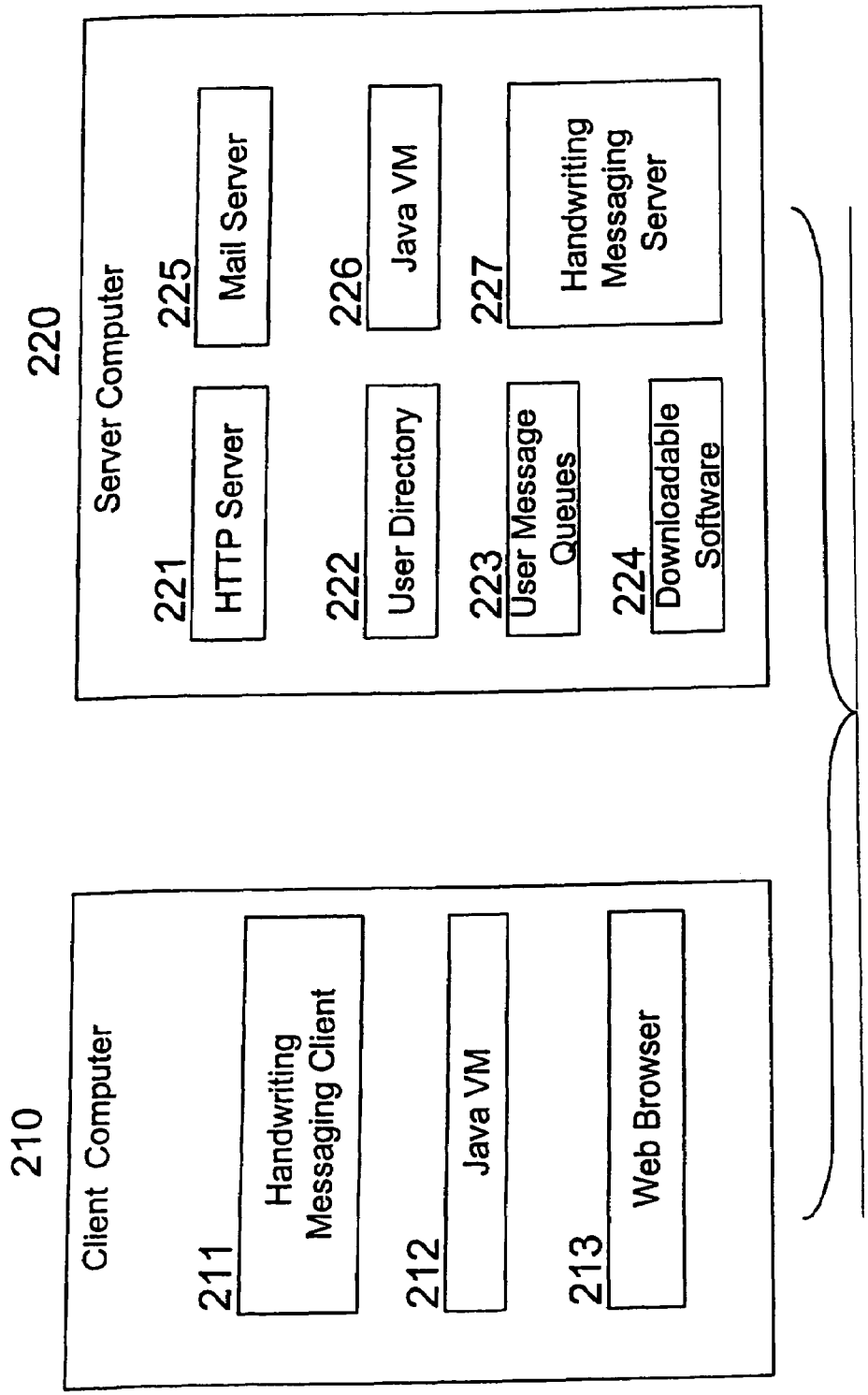
FIG. 1B shows the email handling components of the client and server computers.

In the following description, exemplary embodiments of the handwritten or handdrawn messaging system of the present invention are provided for different network environments, such as handwritten email messaging on the Internet, real-time (instant IM) handwritten messaging on IM networks, handwritten messaging on wireless or digital cellphone networks, and handwritten messaging by mobile devices on wireless data networks. This U.S. patent application is directed particularly to handwritten messaging by mobile devices on wireless data networks.

Referring to FIG. 1A, the general system architecture of the handwritten messaging system (and related method) is illustrated for email networks. A plurality of client computers 110, 111, etc., adapted for handwriting or handdrawing input are used by users to connect via a network (the Internet or any type of multi-user network) to a server computer 120. In the context of this description, the term "computer" is used to refer to any type of data processing device which is capable of executing digitally programmed instructions. The term "client computer" refers to any computer capable of connecting to a server computer on a network and performing a function with the server computer. An example of a typical computer for use on a network is a Pentium or higher class PC with Windows operating system of Microsoft Corp., Redmond, Wash., or MacIntosh or higher class PC with Macintosh OS operating system of Apple Computer Corp., Cupertino, Calif. However, a client computer can also be a wide range of other network-connectable computing devices such as personal digital assistants (PDAs), text messaging pagers, digital cellphones enabled with Wireless Application Protocol (WAP), advanced digital game machines, digital set top boxes for televisions, and even CPU-controlled household appliances. The term "server computer" is used to refer to any type of data processing device that is connected to a node on a network for providing services to client devices on the network.

The client computer 110 is what a sender or recipient uses to compose and send, and receive and view, handwritten or handdrawn email messages. The client computer preferably is of the type that can run a standard web browser which supports an email client, such as those compatible with Microsoft IE 4.x browsers, licensed by Microsoft Corp., of Bellevue, Wash., or Netscape 4.x web browsers, licensed by America Online, Inc., of Fairfax, Va. The standard browsers preferably also support the Java Virtual Machine, Version 1.2 or higher, licensed by Sun Microsystems, of Mountain View, Calif., which is the preferred platform for programming and distributing the handwriting messaging software in the present invention as Java applets or Java-based plug-ins to the browsers. The standard web browsers connect to the network using any standard protocol recognized on the network. For example, on the Internet standard web browsers use the TCP/IP protocol. Connection to the network may be made by modem over a dial-up telephone line, DSL line, cable modem, Internet access connection, or a local area network.

The handwriting or handdrawing input device can be a touch screen, pen input device, stylus pad, optical pointer, mouse, etc., which is attached to the client computer to allow the user to handwrite or handdraw messages in a graphical data capture area of the email client of the web browser set up for that purpose. Examples of such input devices include the Wacom Graphire™ pen tablet sold by Wacom Technology Corporation, of Seattle, Wash., which attaches to the client computer via a serial or USB port. The pen device could also be integrated with a touch screen, e.g., as also offered by Wacom, or part of the computer itself, e.g., as offered with the Sharp SJ5, Copernicus and Pro Stations sold by Sharp Corporation, of Tokyo, Japan.

The server computer 120 is a central processing server for the graphical email system. It is connected to the network to communicate with the client computers using, for example, the TCP/IP protocol on the Internet. In the preferred implementation, the server computer stores the graphical email handling software that is downloaded to the client computers. It authenticates users against a directory of authorized users and manages and tracks the state of concurrent user sessions. For sending and receiving graphical email, it communicates with the graphical email software on the client computers. When a handwriting message is composed on the client computer, the server computer receives the graphical email message and stores it in a database. When a handwriting message is to be viewed by the client computer, the server computer fetches the graphical email message from the database and sends the message to the client computer for display as a handwriting image.

Referring to FIG. 1B, the graphical email handling components of the preferred system are illustrated. The client computer 210 includes a Handwriting Messaging Client 211 which handles sending and receiving graphical email messages, a Java Virtual Machine (VM) 212 which sets up the graphical data capture area and display area for the handwriting message, and the Web Browser 213 which provides the user interface for connecting to the Internet (or other network). There are two versions of the Handwriting Messaging Client software described below, i.e., a Java applet and a Java application version. The Java applet version is used for sending and receiving handwritten email messages via a server computer's mail server functions. The Java application version of the handwriting messaging client software is installed with the users' browsers for real-time messaging between users or via a real-time Java server. The client software includes a drawing editor/viewer for composing and viewing handwritten email messages, as well as the functions to communicate with a server in a server-client configuration.

The server computer 220 includes an HTTP Server Interface 221 for connection to the Internet, a User Directory 222 for identifying email addresses of authorized users, User Message Queues 223 for delivering received messages to users, a Downloadable Software Server 224 for downloading the graphical email software to client computers, a Mail Server Interface 225 for handling sent and received email, a Java Virtual Machine (VM) 226 which provides the platform for interacting with the users' graphical email software, and a Handwriting Messaging Server 227 which formats email messages using the graphical data captured by the software on the client computers. There are four versions of the Handwriting Messaging Server described below, i.e., a Handwriting Java Server Version, a Domino Server Version, a Real-Time Java Server Version, and an Internet Email Server Version.

Handwriting Java Client and Handwriting Java Server Version

Figure 2A:
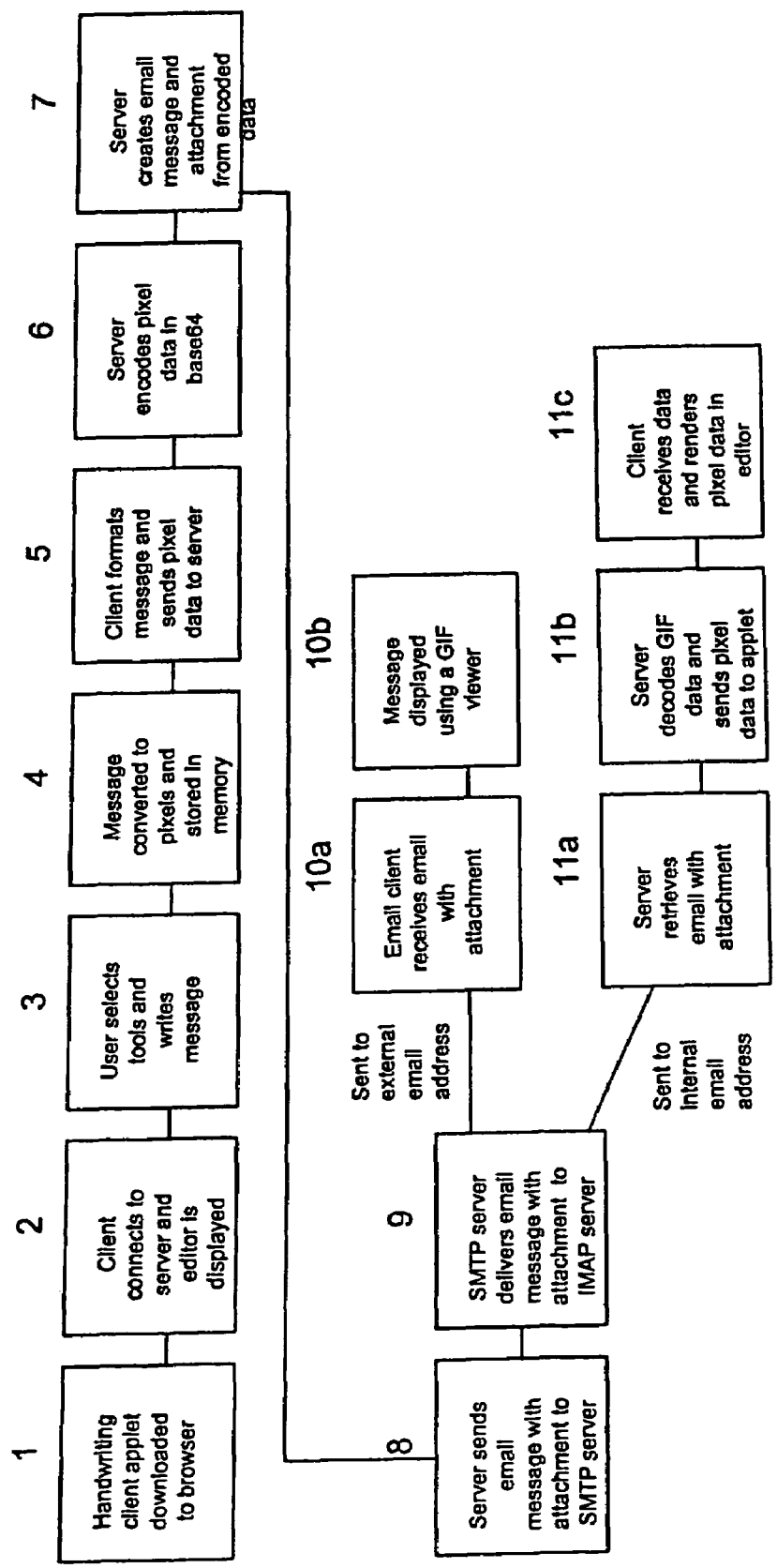
FIG. 2A is a process flow diagram of an SMTP server version of the graphical email system.
Figure 2B:
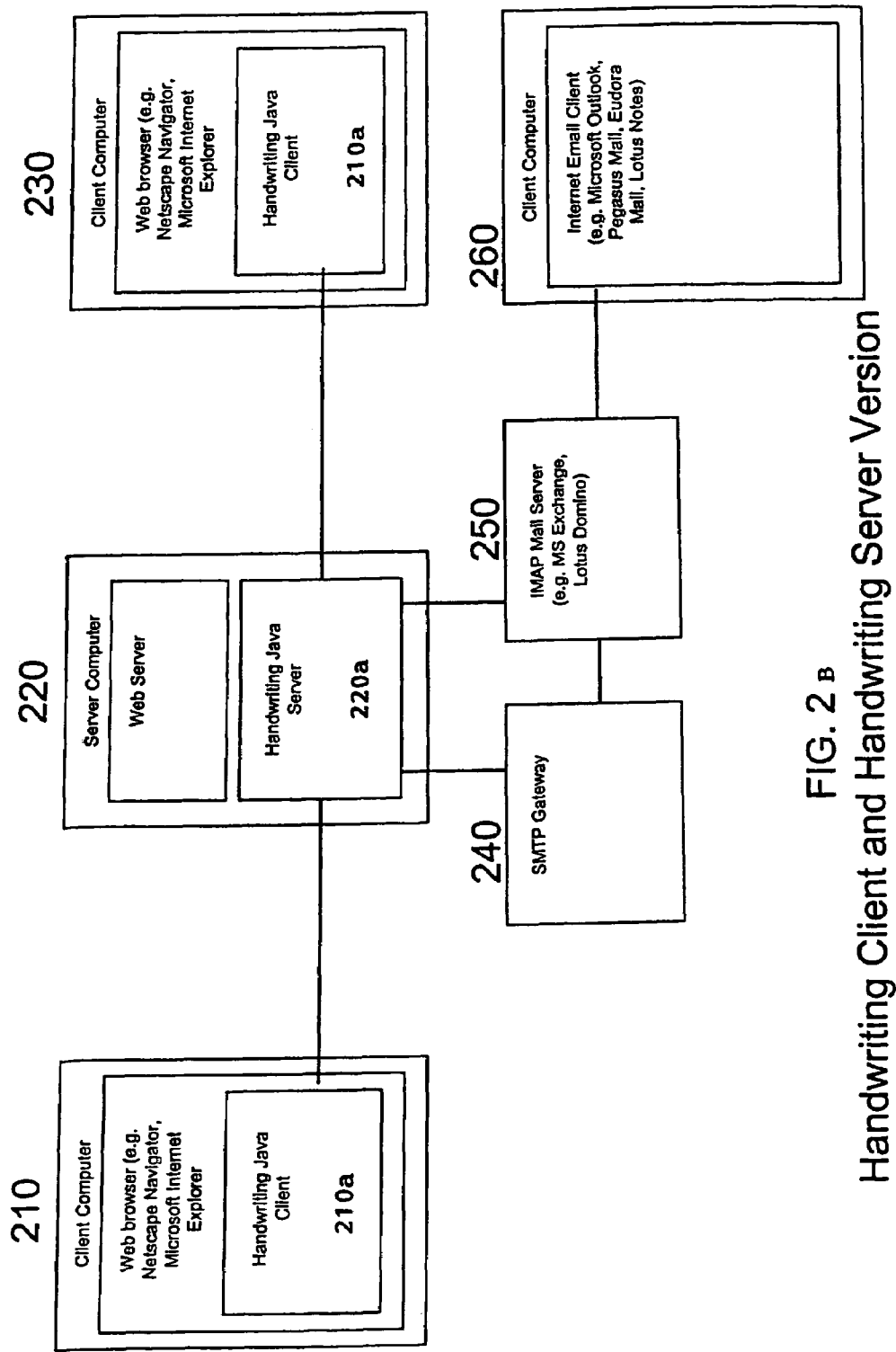
FIG. 2B is a schematic illustration of the network connections of this version of the graphical email system.

With reference to FIG. 2B, this version of the system uses both handwriting client and server software components along with the usual email server functions. A Handwriting Java Client 210a operates in a web browser (such as Netscape Navigator or Microsoft Internet Explorer) as a Java applet on the client computer 210. The applet 210a provides a drawing editor to compose and send handwritten email messages, and on the receiving end, also provides the drawing viewer to view the handwritten message. The implementation of a Java applet for the handwriting messaging function is described in further detail below. Generally, the use of a Java applet to provide a drawing application intended to run in a browser is known to those knowledgeable in this field. As one example, a Java applet used to set up a drawing editor in a browser for a "whiteboard" application run on an intranet is the SameTime™ whiteboard applet offered with Lotus™ Notes, a workgroup software suite distributed by Lotus Development Corp., of Cambridge, Mass., which is a division of IBM Corp., Armonk, N.Y.

A Java applet is created specifically for setting up a drawing editor/viewer operable with an email client running with a web browser for capturing, sending, receiving and viewing a handwriting or handdrawing email message. The Java applet consists of a set of modules which run the different messaging functions of the drawing editor/viewer. The data capture and sending module operates by first recognizing the handwriting input device connected to the client computer, then creating a temporary memory space for holding the input received from the input device, capturing the input signals from the input device (usually a series of coordinate data inputs representing time-sampled coordinate positions detected for the trace of the input device), converting the input signals to pixel data (screen coordinates, color, intensity), and displaying the pixel data in a display area or "panel" of the email client to show the handwriting or handdrawn image input by the user through the input device. The display allows the user sending a handwritten email message to verify what is being written, and is also the same display that allows a user receiving the handwritten email message to view the corresponding image. An example of a data capture and sending module according to the invention is illustrated in the source code listing appended hereto as Appendix I.

When the graphical email message is completed, the user addresses the message to a recipient and sends it. The Handwriting Java Client formats and sends the email message with the pixel data to the Handwriting Java Server component 220a on the server computer 220, which converts the pixel data to a GIF file attachment to a standard email body. The Handwriting Java Server component 220a communicates with an SMTP email gateway computer 240 to send email messages using the industry-standard SMTP Internet protocol. The SMTP email gateway sends the email messages to mail servers 250, such as an industry-standard IMAP (Internet Message Access Protocol) mail servers like MS Exchange or Lotus Domino on the Internet. Email recipients can retrieve their email from the mail servers 250 using a standard Internet email client 260, such as Microsoft Outlook, Pegasus Mail, Eudora mail, or Lotus Notes. When the graphical email is retrieved with a standard Internet email client, the handwritten drawing is viewed as a file attachment using a GIF viewer operates with the web browser. Email recipients on client computers 230 who have the Handwriting Java Client 210a in their web browser can receive their handwritten email messages directly. The graphical email message is retrieved from the Handwriting Java Server component 220a on the server computer 220 and displayed in the Handwriting Java Client viewer as a handwritten or handdrawn image.

With reference to FIG. 2A, the specific process steps involved with sending a handwritten email message and viewing it by the recipient are described in detail below:

1. The Handwriting Java Client software is downloaded from the Handwriting Java Server to the client computer through a web page that is displayed in a web browser.

2. The Handwriting Java Client software is initialized and establishes a connection to the Handwriting Java Server using the industry-standard TCP/IP and remote method invocation (RMI) protocols. After initialization is complete, the Handwriting Java Client software displays a drawing composition editor that is used to compose the handwritten message.

3. The handwritten message is composed by the user in a graphical data capture area set up by the drawing editor, selecting the appropriate writing and drawing tools, colors, and styles as offered in the Handwriting Java Client software.

4. While the user is drawing in the graphical data capture area, the pixel data representing the drawing is stored in local memory. When the graphical email message is completed, the user addresses the message to a recipient using Javascript fields on the web page in which the Java handwriting client is embedded.

5. When the user issues a "Send" command, the Handwriting Java Client formats the message and sends the pixel data to the Handwriting Java Server. The graphical message is still in GIF format at this time.

6. The Handwriting Java Server processes the graphical message data using standard base64 encoding. This turns the data into ASCII text that can be transmitted as standard email data packets by the Handwriting Java Server.

7. The Handwriting Java Server creates an outgoing email message that contains the encoded handwritten message as a GIF attachment.

8. The Handwriting Java Server sends the outgoing email message with GIF attachment via the SMTP (Simple Mail Transfer Protocol) gateway 240.

9. The SMTP gateway transfers the message to an IMAP mail server based on the recipient's address. The IMAP server allows clients running it to retrieve mail from the host mail server also running the protocol, similar to POP-3, but with extended capabilities. Recipients can open the email as a standard email message with a GIF attachment (steps 10a, 10b below) or with a Handwriting Java Client applet if downloaded to their web browser (steps 11a, 11b, 11c below).

10a. The IMAP server sends the email with the handwritten message as an attached encoded GIF file to an external email address for the recipient.

10b. When the recipient opens the email containing the attachment, the message can be displayed on their computer using a GIF viewer.

11a. The IMAP server sends the email with the handwritten message as an attached encoded GIF file to an internal email address, i.e., to an address on a server computer 220 that is running the Handwriting Java Server component 220a.

11b. The Handwriting Java Server decodes the attached GIF file into pixel data and sends it to the Handwriting Java Client applet running in the recipient's web browser.

11c. The Handwriting Java Client receives the pixel data from the Handwriting Java Server and renders the pixel data as a handwritten or handdrawn image in the drawing editor/viewer.

Handwriting Java Client and Domino Server Version

With reference to FIG. 3B, this version of the system uses the Handwriting Java Client 310a along with a Lotus™ Domino Server on the server computer 320. As before, the Handwriting Java Client 310a operates in a web browser as a Java applet on the client computers 310, 330. The applet 310a provides a drawing editor/viewer to compose and view handwritten messages. For sending and receiving email internally, the applet 310a communicates with the Domino Server on the server computer 320. The Domino server sends email messages among users with client computers running Java client software connected to the server's intranet. The Domino Server communicates with an SMTP email gateway computer 340 to send email messages externally using the SMTP Internet protocol. The SMTP email gateway sends the email messages to mail servers 350 on the Internet. External email recipients can retrieve their graphical email using a standard Internet email client 360. The handwritten drawing can then be viewed as a file attachment using a GIF viewer such as a web browser.

Figure 3A:
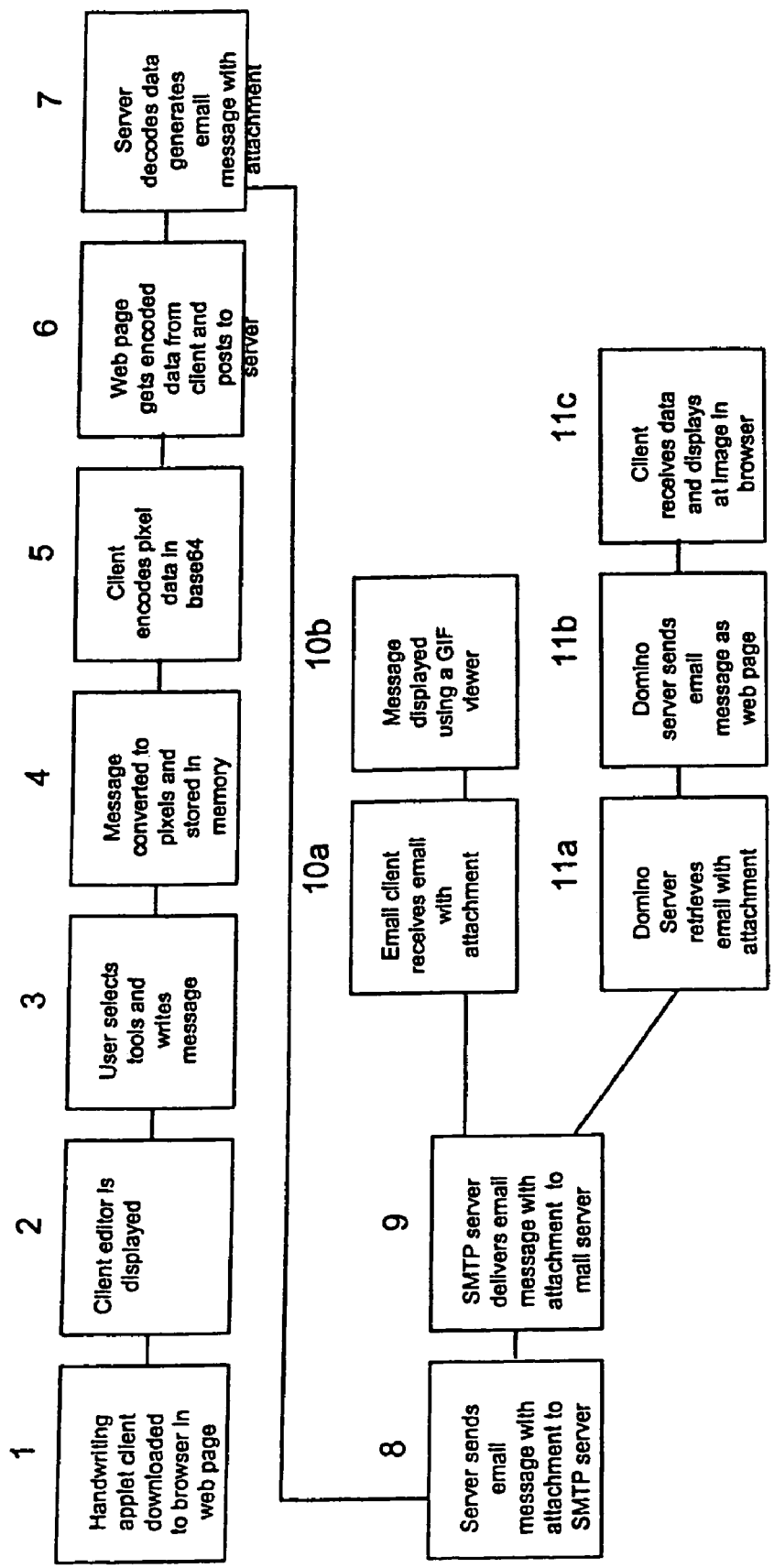
FIG. 3A is a process flow diagram of a Lotus™ Domino server version of the graphical email system.
Figure 3:
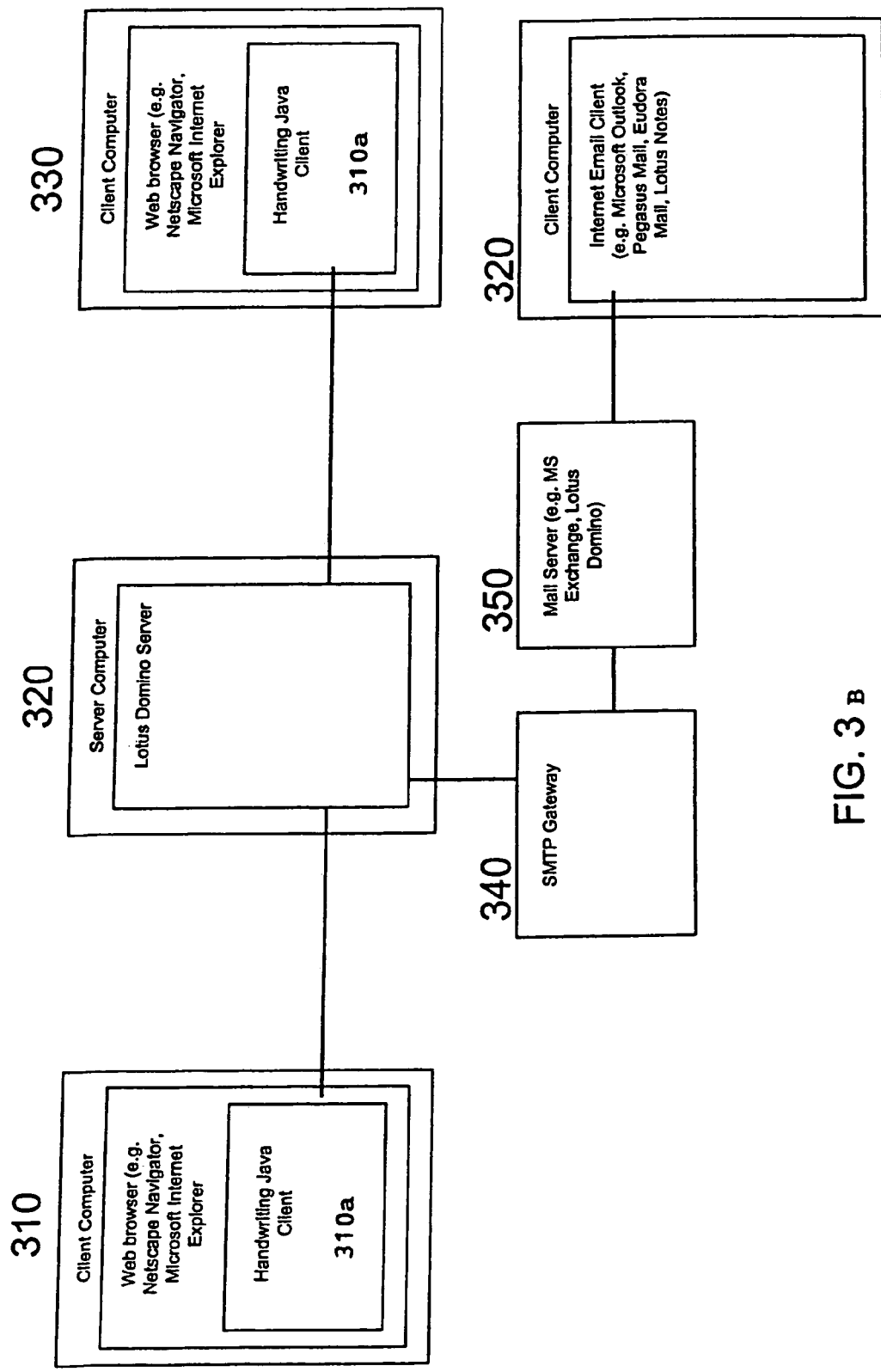
FIG. 3B is a schematic illustration of the network connections of this version of the graphical email system.

With reference to FIG. 3A, the process steps involved with sending a handwritten email message through a Domino Server and viewing it by the recipient are described in detail below:

1. The Handwriting Java Client software is downloaded from the Handwriting Java Server to the client computer through a web page that is displayed in a web browser.

2. The Handwriting Java Client software is initialized and establishes a connection to the handwriting Domino Server using the TCP/IP and remote method invocation (RMI) protocols. After initialization is complete, the Handwriting Java Client software displays a composition editor that is used to compose the handwritten message.

3. The handwritten message is composed by the user selecting the appropriate writing and drawing tools, colors, and styles.

4. While the user is drawing, the pixel data representing the drawing is captured in the input data area and stored in local memory. The user addresses the email message to a recipient using Javascript fields on the web page in which the Handwriting Java Client is embedded.

5. When the "Send" command is issued, the Handwriting Java Client encodes the pixel data in base64 format.

6. The Web page along with the encoded image is posted to the Domino Server using Javascript.

7. An agent on the Domino Server decodes the image and creates an email message with an attached GIF file.

8. The Domino server sends the email message with attachment to an external recipient's address via an SMTP (Simple Mail Transfer Protocol) gateway.

9. The SMTP gateway transfers the email message to a mail server, which routes the message to the recipient's email box.

10a. an external recipient's e-mail client retrieves the email message with the GIF attachment from an Internet email server.

10b. When the user (recipient of the email) opens the email containing the GIF attachment, the handwritten message in the attachment can be displayed using a GIF viewer.

11a. If the recipient has an internal email address handled by a Domino Server, the server retrieves the email message with the GIF attachment.

11b. The Domino Server sends the email message to the client computer as a web page when the client requests the page via their web browser email client.

11c. The client's web browser email client displays the handwritten message as an image.

Handwriting Java Client and Real Time Server Version

Figure 4A:
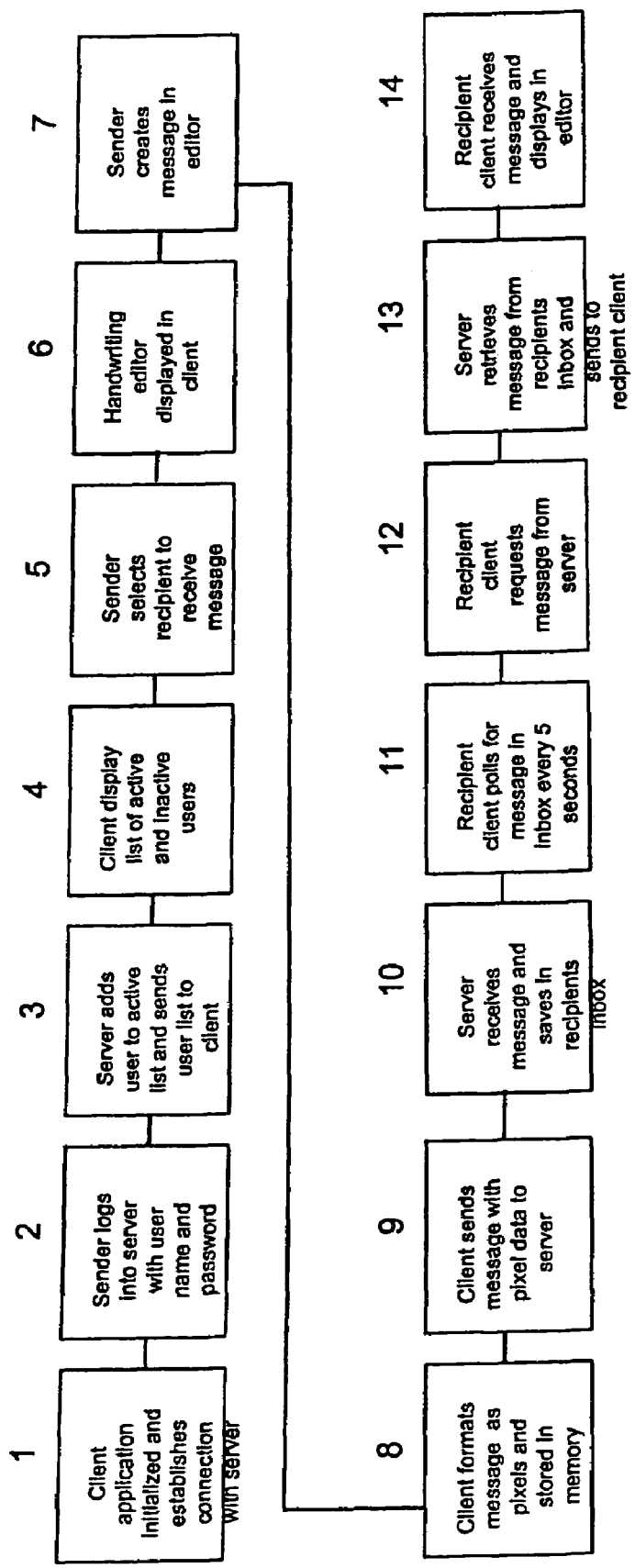
FIG. 4A is a process flow diagram of a real-time messaging server version of the graphical email system.
Figure 4B:
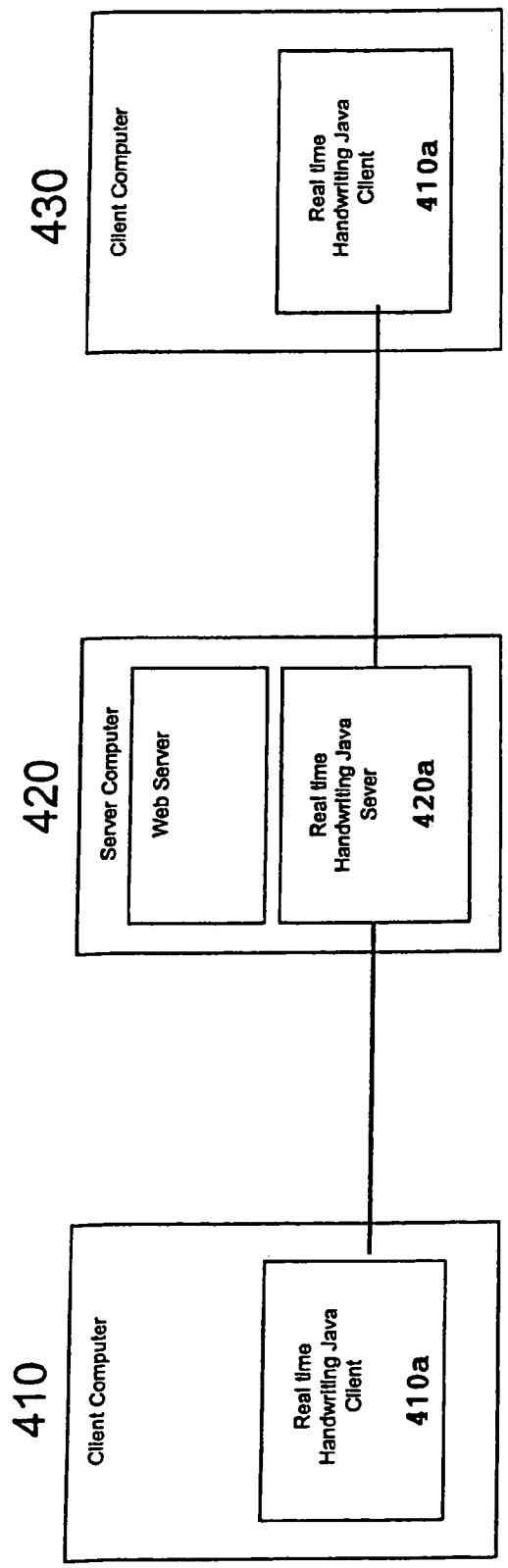
FIG. 4B is a schematic illustration of the network connections of this version of the graphical email system.

With reference to FIG. 4B, this version of the system uses the Handwriting Java Client with a Real Time Handwriting Java Server. As before, the Handwriting Java Client 410a operates in a web browser as a Java applet on the client computer 410, 430. The applet 410a provides a drawing editor/viewer to compose and view handwritten messages. The applet 410a communicates with the Real Time Java Server component 420a on a server computer 420. The receiving Handwriting Java Client is notified when an email message for that user has been sent to the Real Time Java Server, and retrieves the email message from the server. In this way, communication can take place using the Handwriting Java Client in near real-time. This version is useful for users using mobile communication devices, such as PDAs, WAP-phones, etc.

With reference to FIG. 4A, the process steps involved with sending a handwritten message through a Real-Time Handwriting Java Server and viewing it by the recipient are described in detail below:

1. The client computer has a downloaded version of the Handwriting Java Client software, and establishes a connection with the server computer on which the Real Time Java Handwriting Server is running.

2. The client computer identifies the user to the server by entering a user name and password.

3. The server maintains a list of registered users, and a list of currently active users. When the client logs onto the server, the server looks up the user name and password in order to authenticate that person as a registered user, then the user is added to the list of active users.

4. The client computer displays a list of active and inactive users which is downloaded from the server.

5. The user clicks on a name from the list of active users to identify the user to whom they want to send a message.

6. After the user selects a name from the list of active users, the handwriting editor is displayed in the Handwriting Java Client.

7. The user creates a message by selecting the appropriate writing and drawing tools, colors, and styles.

8. The Handwriting Java Client formats the message and stores it as pixel data until it is ready to be sent.

9. The completed message is sent to the Real Time Java Handwriting Server in pixel format.

10. The server receives the message and puts it into a repository where it can be retrieved by the user to whom it is addressed.

11. All active client computers poll the repository on the server every five seconds to see if there are any messages for them.

12. When the Handwriting Java Client on the recipient's computer discovers a message in the repository, the client computer requests the message from the server.

13. The server retrieves the message from the repository and sends it to the client computer of the recipient.

14. The recipient's client computer displays the message in the Handwriting Java Client's drawing editor/viewer.

Handwriting Java Client and Internet Email Server Version

Figure 5:
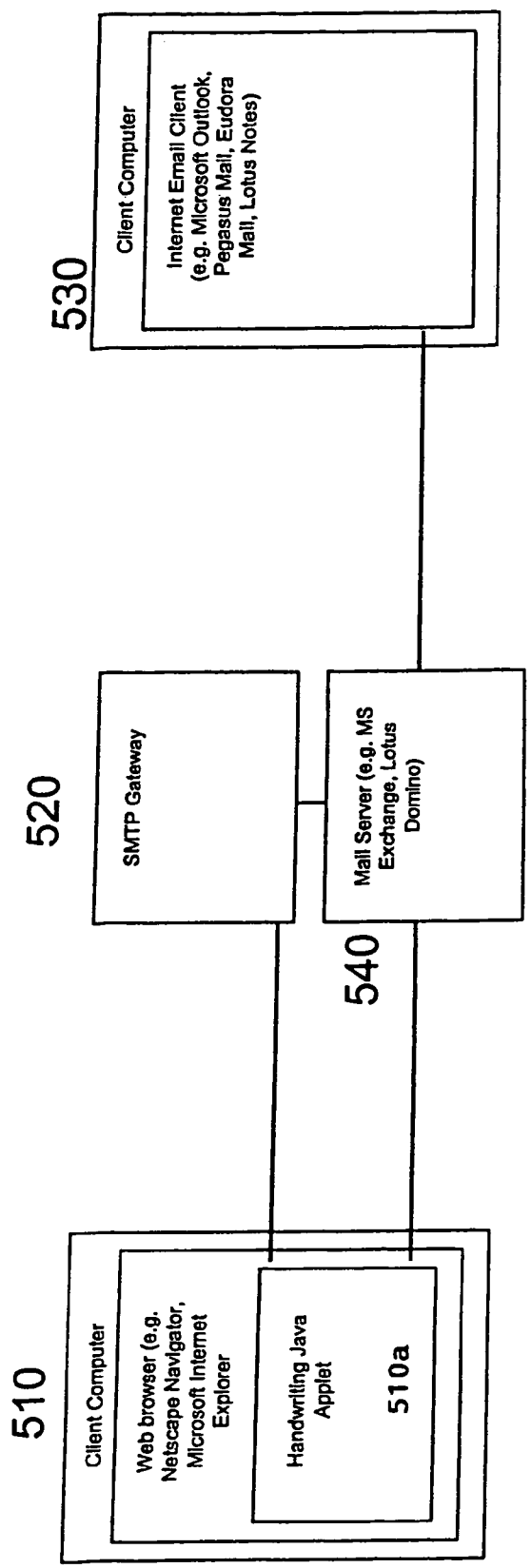
FIG. 5 is a schematic illustration of the network connections of an Internet email server version of the graphical email system.

With reference to FIG. 5, this version of the system uses the Handwriting Java Client along with a standard Internet email mail server. In this version, the Handwriting Java Client is installed as a plug-in to the client computer's web browser and operates as described before, and there is no Handwriting Java Server component. The Handwriting Java Client 510a operates in a web browser as an installed Java applet on the client computer 510. The applet 510a provides a drawing editor/viewer to compose and view handwritten messages. The Handwriting Java Client formats the message and stores it as pixel data until it is ready to be sent. The message is addressed using Javascript fields on the Web browser form in which the Java applet is embedded. The pixel image is converted into a GIF file and attached to the email message. The Java applet 510a communicates with the Mail Server computer 540 either directly or through an SMTP gateway computer 520. The Mail Server 540 sends the email message with encapsulated GIF image directly to the recipient's client computer 530, and the recipient views the attached GIF file using whatever GIF viewer they have available on their computer.

Handwriting Java Client and Wireless Internet Email Server Version

Figure 6:
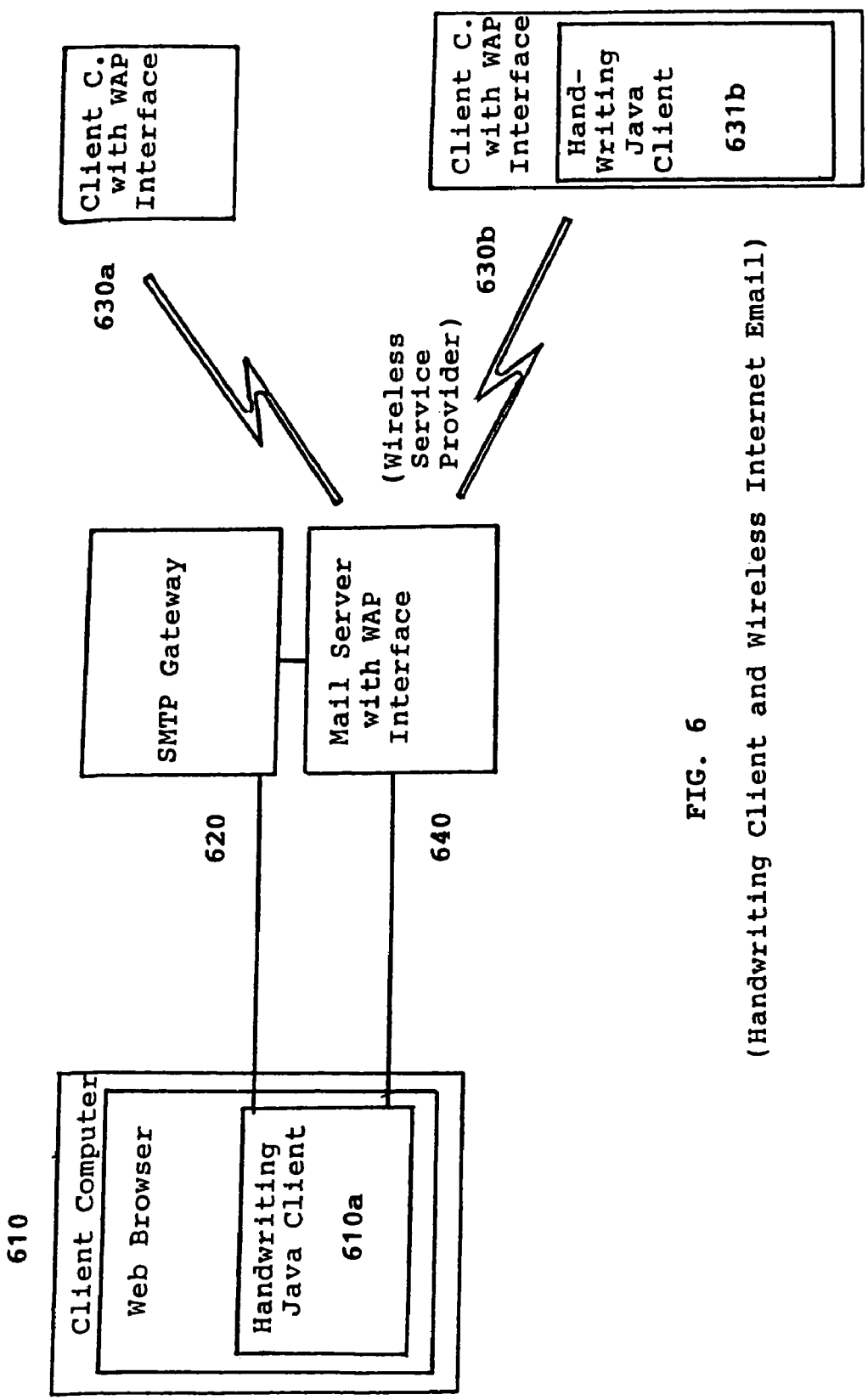
FIG. 6 is a schematic illustration of the network connections of a WAP-enabled cellphone or PDA version of the graphical email system.

With reference to FIG. 6, this version of the system uses the Handwriting Java Client along with a standard Internet email mail server providing email service to wireless client computers, such as WAP-phones and PDAs. As before, the Handwriting Java Client 610a operates in a web browser as an installed Java applet on the client computer 610. The email message is formatted with the handwritten image converted into an attached GIF file. The Java applet 610a communicates with the Mail Server computer 640 either directly or through an SMTP gateway computer 620. The Mail Server 640 includes a Wireless Application Protocol (WAP) interface which sends the email message with encapsulated GIF image through a Wireless Service Provider having WAP handling capability to the recipient.

The recipient's computer can be a thin client 630a such as a digital cellphone with a WAP interface for receiving the email message via Internet and displaying the GIF file via its mini-web browser. Alternatively, the client computer may be a more robust, mobile client computer 630b such as a Palm Pilot™ or similar type of PDA, which has the memory and CPU capacity to have a Handwriting Java Client installed with its web browser and use it for composing and sending handwriting email messages as well as viewing them. The mobile client computer can then use the Handwriting Java Client to format the handwritten message as an attached GIF file (described in the Internet Email Server version) or as pixel data sent with the email for viewing by another client computer having a Handwriting Java Client running in its web browser (as described in the Real-Time Server version).

A handwriting messaging application written for a palm-top or PDA device would currently have to be written in C or C++ because there are no current Java Virtual Machine adaptations that can be used for such devices. However, several efforts are underway to create such Java VM modules for palm-top and PDA devices. Using C/C++ to write full applications on palm-top devices has the current advantage that the security sandbox imposed on Java applets does not exist, thereby allowing a wider variety of messaging applications to be written, as long as actual implementations are kept simple (due to low CPU power and memory storage availability). The handwriting client can be kept simple by including only pen and eraser tools and different line thicknesses. Only palm-top devices with color displays would need a color palette; black and white palm-top devices would dither incoming messages to black and white while sending only two-color images. Since the client is written in C or C++, networking would be limited to standard TCP/IP communications instead of Java's RMI. For communications through a proxy, packets can be wrapped in HTTP and sent through an HTTP proxy. If a handwriting server component is used with the palm-top devices, it would remain largely the same as described above, except that it would handle only standard TCP/IP communications, and would add the ability to receive messaging information wrapped in HTTP packets from behind a firewall.

The functions of the module of the client component which converts and sends the handwritten message for handling as an email message depends upon the configuration of the system. If the system is configured with a Lotus Domino server on a Java VM platform, then the captured handwriting data is sent as a message to the Domino server in the form of a stream of pixel data which is converted by the server to a Graphics Interface Format (GIF) file and appended with an email header to form an email message handled by the server's email service. If the system is configured with a standard type of Internet email server, then the captured handwriting data can be converted at the client computer to a GIF file and sent as an email message to the Internet email server. If the system is configured for real time messaging between client devices, the client device can send the handwritten message as a GIF file appended to standard email, or send it as pixel data to a real-time messaging server which provides real-time messaging service between client devices.

Figure 7A:
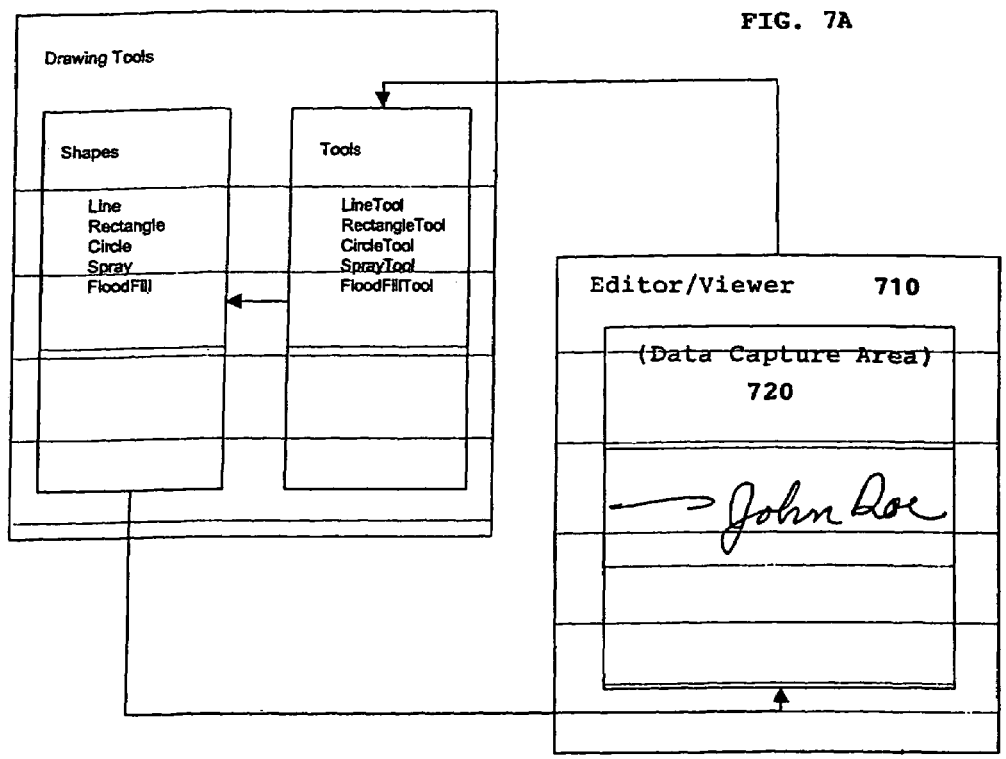
FIG. 7A is a schematic illustration of the user interface for the graphical data capture and drawing functions of the graphical email system.
Figure 7B:
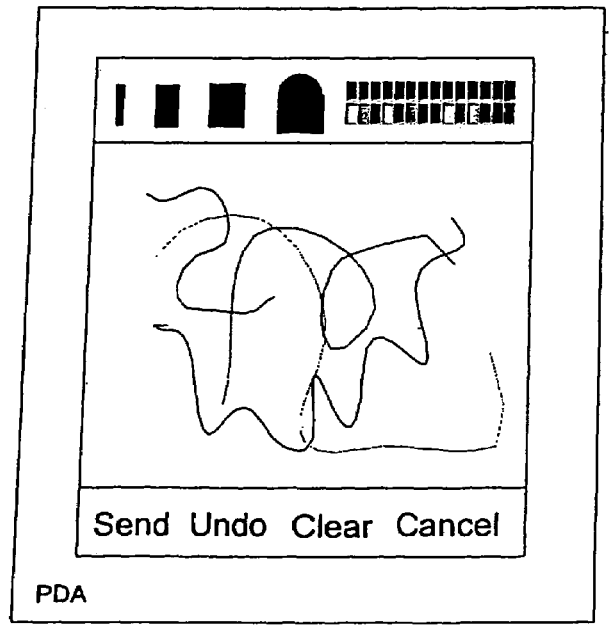
FIG. 7B is an example of an editor/viewer interface for the graphical email system on a personal digital assistant (PDA).

In FIG. 7A, the user interface for the drawing editor/viewer of the Handwriting Java Client is illustrated. For composing a handwritten message, the editor/viewer 710 has a graphical data capture area 720 in which handwritten input can be entered with a touch pen or on a stylus pad and captured as pixel data. The editor/viewer 710 can offer a suite of standard types of drawing tools such as making line, circle, or polygon shapes and spraying and filling image areas. The graphical data capture area 720 is also the graphical image viewing area for email received with an attached GIF file or pixel data. In FIG. 7B, a typical layout for a PDA of the editor/viewer interface with drawing tools and color palette is illustrated.

Handwriting Client and Wireless Real Time Server Version

The version of the system illustrated in FIG. 6 may be modified for real-time messaging between PDAs and mobile communication devices of the "always on" type that are connected to a real-time server through an Internet Wireless Service Provider, rather than a WAP-type phone interface. Examples of "always-on" types of Internet wireless messaging include Research in Motion's (RIM's) BlackBerry™ pager email devices, Motorola Timeport™ P935 Personal Communicator, or the Palm's announced i705 wireless device with always-on access to email.

Similar to the sequence outlined above for the Handwriting Java Client and Real Time Server Version, the always-on wireless messaging device is provided with a handwriting client that sets up a handwriting (e.g., stylus) data capture area in the device to capture the sender's handwriting input and send it as an attachment with a wireless email or message transmission. The wireless service provider employs a real-time server that receives the wireless email or message through the appropriate wireless Internet service interface and routes the message to a private mail or message repository for the intended recipient. If the recipient has an always-on device, the message in that person's private repository is sent to the recipient's device through wireless transmission, where it pops up as a message in the device display. With a handwriting viewer or a mode for viewing attached graphics files, the recipient sees the message instantaneously as handwriting.

The wireless real-time server version allows people to communicate privately and personally by instantly sending handwriting and other graphical data to each other. The handwriting client has utilities to allow a user to maintain an address book of people they wish to communicate with. When the user logs on to the real time server, they are authenticated with a user name and password and are registered as an active user. The handwriting client allows the user to see other users that are currently on-line and to initiate a private, real time communication session with an on-line user. The handwriting client accepts handwritten and other graphical messages, packages the data in a message and sends it to the recipient. The recipient receives an audible notification that they have a message and is able to view the message in their handwriting client. The recipient is also able to reply to the sender by composing a new handwriting message or copying and writing over the original message that was received. This person-to-person communication can continue back and forth, effectively allowing the parties to communicate using handwriting and drawings.

This method of instantly sending handwriting between to parties differ from other real time communication systems such as chat sessions and systems commonly referred to as "electronic whiteboards" and "instant messaging systems" in the following ways.

1. Private message pools for graphical messages: In the invention, graphical messages to be sent to a recipient are stored in the recipient's private message pool and not a shared, common pool. The recipient's client software polls their personal pool and not a common area. This method supports private, one-on-one communications similar to email, except in real time. Chat rooms and whiteboards are intended for group communication and incorporate shared message pools.

2. Graphical handwriting client: The invention allows users to communicate using handwriting input rather than text input. The handwriting client is essentially a graphics input editor implemented in Java which communicates with a real time server. The real time server converts the input data into a real time messaging format that is stored in a repository location and retrieved by the recipient's client.

3. Control over when message is sent: In the invention handwriting messages are composed privately in the handwriting client and sent on demand by the sender, similar to how standard text email is composed locally and sent on demand. Whiteboard systems send graphical data in real time as they are drawn to all users that are viewing the whiteboard.

The wireless real time server version may also be implemented on portable PDA devices and mobile phones that use the Short Messaging Service (SMS) or Enhanced Messaging Service (EMS) for wireless instant messaging on wireless phone service. SMS and EMS now permit graphics attachments to be sent with messages. The handwriting client software can be implemented to run on these mobile devices using a micro or personal Java platform that are becoming available on these devices. The real-time server can correspondingly be adapted with an interface to support handwriting messages sent through the messaging formats used by these mobile messaging devices.

Handwriting Java Client for MMS Messaging in Cellphone Network Version

Figure 8:
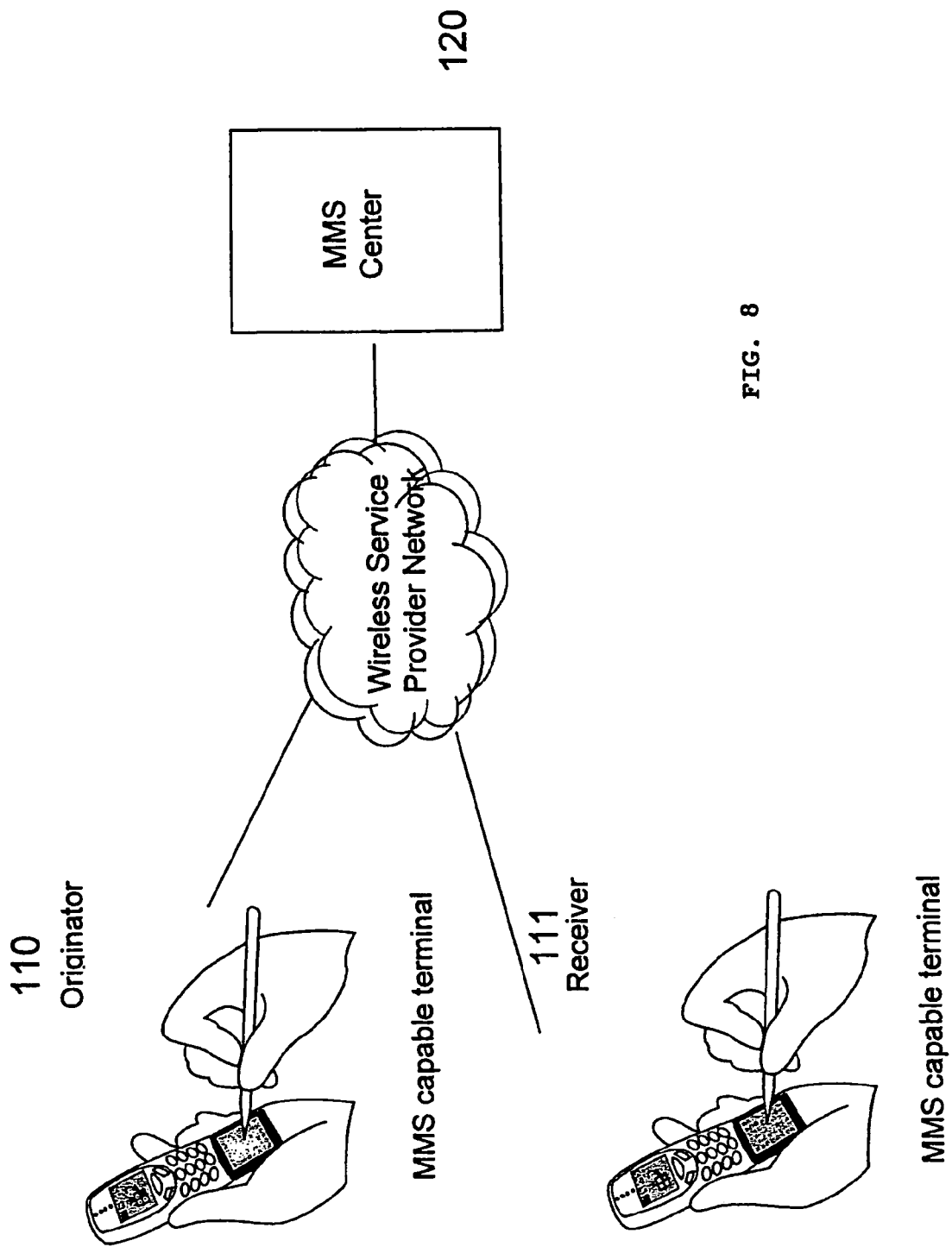
FIG. 8 is a schematic illustration of the handwritten messaging system operable on a wireless or cellphone device network.

In FIG. 8, the MMS Cellphone Messaging version of the handwriting messaging system allows people to communicate privately between MMS capable terminals by composing and sending handwriting and other graphical data to each other. The originator composes a handwriting message using a pen device connected to the handset and addresses the message to the receiver. An MMS compliant message is created and sent to an MMS Center (MMSC) that is provided by the originator's wireless service provider. The MMSC attempts to forward the message to the receiver. If the receiver is unavailable, the MMSC stores the message and delivers the message later. If the message cannot be delivered within a certain amount of time, the message is discarded.

MMS is becoming a standard method for sending and receiving multimedia content over wireless networks. Just as our original invention took advantage of standard methods for sending SMTP based email between computers, the same principle can be implemented for digital wireless phone devices and Internet-capable phones (I-phones) using a digital messaging protocol, such as the now standard MMS protocol (as published by the MMS Conformance Group), for wireless mobile devices. The handwriting client software can readily be implemented to run on mobile devices using the Java 2 Micro Edition (J2ME) platform that are becoming commonly available on these devices.

The Java client software is programmed to set up the graphical data capture input area in the client device and capture the graphical (pixel) data for conversion to a standard format such as jpeg or gif handled by the digital messaging protocol used in digital phone devices or I-phones. For example, the MMS protocol can support jpeg and gif files converted by the handwriting client application in the following manner. While the user is drawing with a stylus or pen on the graphical data capture area, the pixel data representing the drawing are stored in local memory in the client device. The user can address the handwritten message to a recipient using Javascript fields of the graphical interface in which the Java handwriting client is embedded. When the SEND MESSAGE command is selected by the user, the Handwriting Java Client formats a message with the pixel data in gif format to the Handwriting Java Server, which then processes the message and sends it to the MMS-compliant client device of the recipient using the MMSC server protocol.

Figure 9:
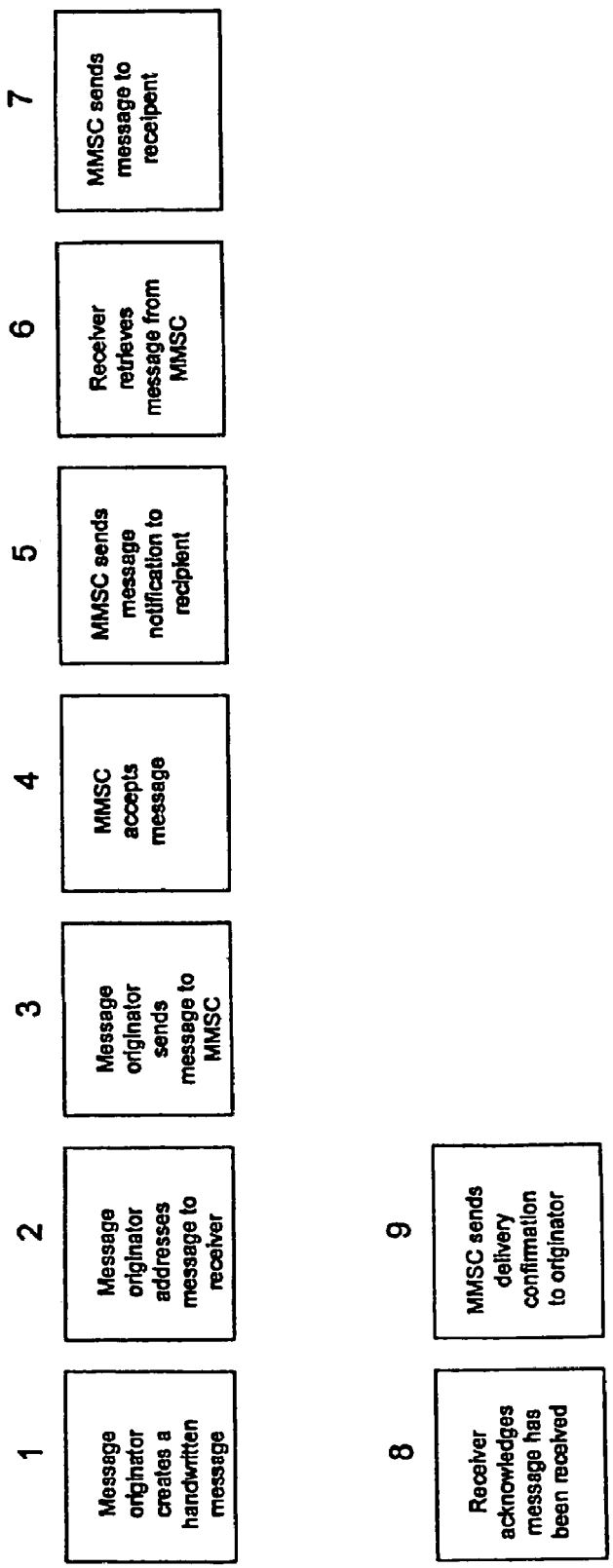
FIG. 9 is a block diagram illustrating the operational sequence for the handwritten messaging system.

In FIG. 9, the steps involved with sending a handwritten message and viewing it by the recipient are illustrated using MMS-compliant mobile phone devices.

1. The handwriting client software is used to compose a handwritten message. The handwriting client software is running in a J2ME environment that is available on mobile devices. The mobile phone also has a pen enable screen or an attached pen pad device that captures the user's pointer movements. The handwriting client software allows the users to select drawing tools and captures the handwriting image created by the pointer movements. Images can be captured with the mobile devices camera or downloaded as a background graphic that can be annotated with handwriting and is included in the message.

2. The originator addresses the message to the recipient(s).

3. The originator's terminal contains information about the wireless provider's MMSC, initiates a Wireless Access Protocol (WAP) connection and sends the handwriting message as the content of the WSP POST command 4. The MMSC accepts the message and responds to the originator over the same WAP connection. A "message send" indicator is displayed on the originator's terminal.

5. The MMSC uses WAP PUSH command to attempt to send an indication message to the receiver.

6. The receiver's terminal initiatives a WAP connection and uses the WSP GET command to retrieve the handwritten message from the MMSC.

7. Handwritten message is sent to the receiver's terminal as content of a WSP GET RESPONSE command over the same WAP connection. The receiver's terminal indicates, "Message received"

8. The receiver's terminal acknowledges receipt with WSP POST command over the same WAP connection.

9. The MMSC uses WAP PUSH command to indicate to originators that message was delivered. The originator's terminal indicates, "Message delivered".

Figure 10:
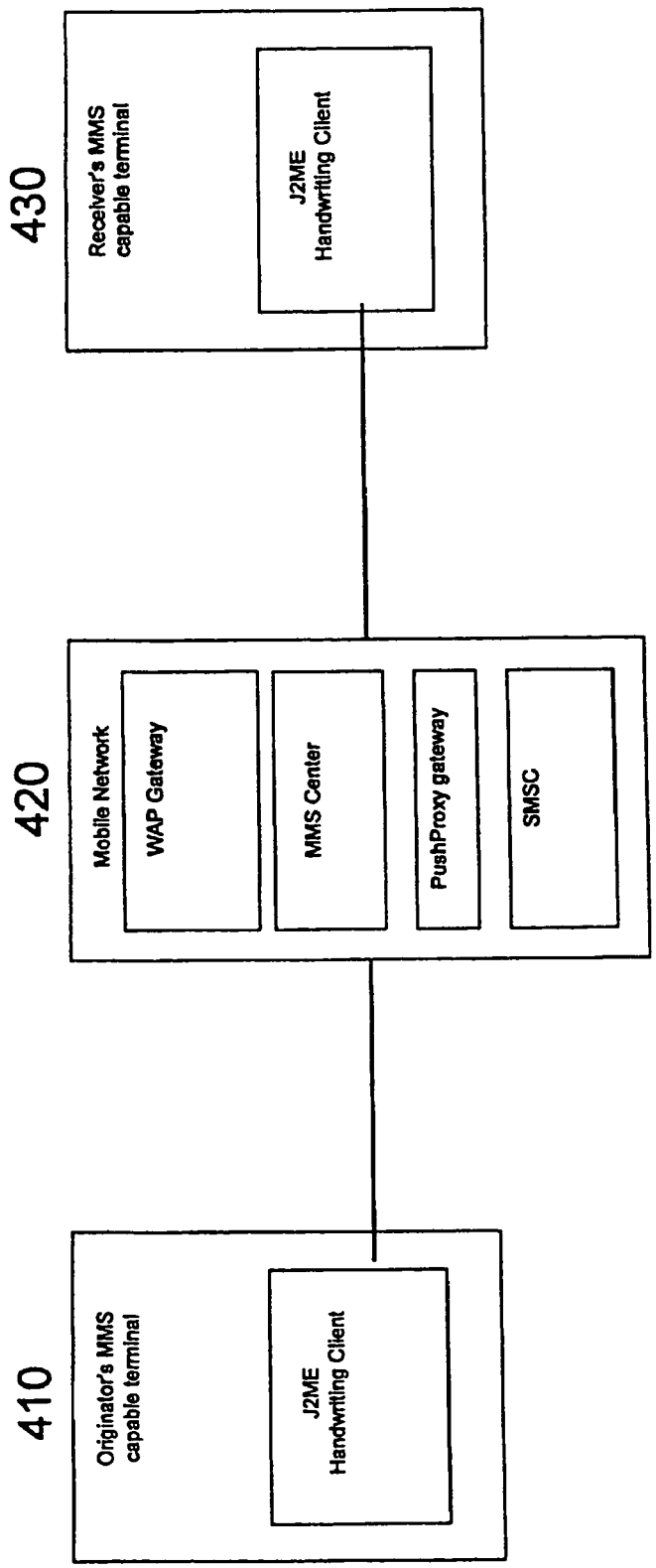
FIG. 10 is a schematic diagram of the interconnection of components of the handwritten messaging system.

In FIG. 10, the interconnection of components of the present MMS handwritten messaging version is illustrated. The sender's wireless or digital cellphone device 410 has a J2ME handwriting client installed for capturing handwritten input as graphical data and sending it as an MMS message using the standard MMSC protocol. The MMS message is received at a mobile network center 420 which includes a WAP gateway, and MMS (message processing) center, a PushProxy gateway and SMSC transmission protocol. The MMS message from the sender is "pushed" to the recipient's wireless or digital cellphone device 430 which similarly has a J2ME handwriting client installed for viewing (and sending back replies to) the MMS message. The recipient can thus view the handwritten message as a graphical image on the mobile receiving device.

Handwritten Messaging System for Mobile Devices

Figure 11:
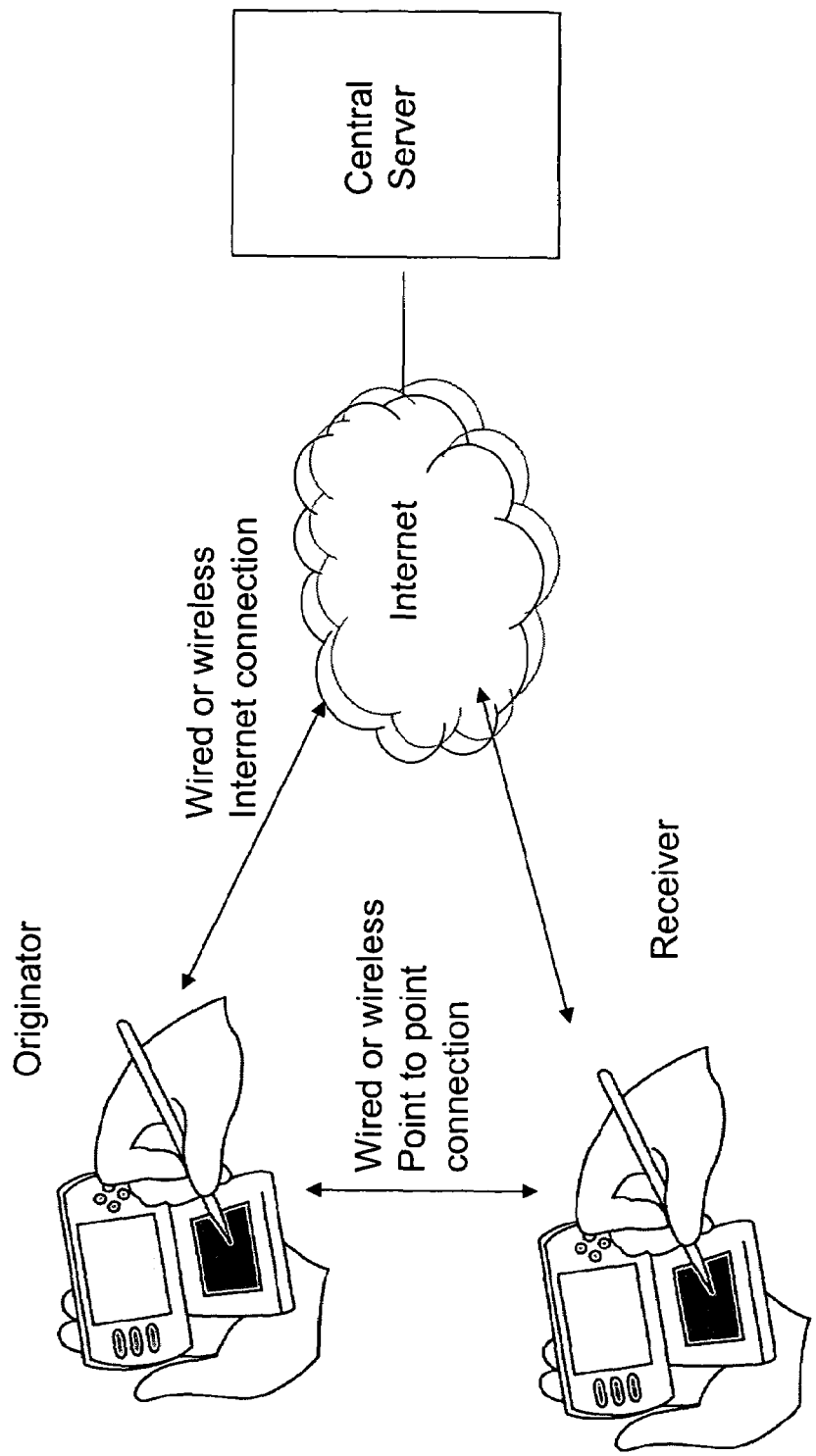
FIG. 11 illustrates the use of the handwriting messaging component for enabling the messaging client of mobile devices to send and receive handwritten messages via a data transmission network.

In FIG. 11, a handwritten messaging system for mobile devices is illustrated in which an Originator writes on a touch-sensitive display screen of a mobile device which has a handwriting messaging component operable with a messaging client on the mobile device for capturing the handwritten message as graphical data and sending it as a handwritten electronic message on a data transmission network. The handwriting messaging component is a small-footprint software module programmed for the computing environment used in the computing platform of the mobile device. It operates by setting up a data capture area of the messaging client as a handwriting or handdrawing Editor/Viewer on the touch-sensitive display screen, such as shown for the PDA in FIGS. 7A and 7B. The user can thus write a message directly on the touch display screen and click the "Send" icon of the messaging client to send a handwritten electronic message.

The data transmission network can be wired or wireless type. Examples of wireless data transmission include WiFi "hotspots" (nodes) connected to the Internet with email and other types of data messaging handled by Internet servers, or local wireless networks with a local network server or each mobile device acting as a local server to other mobile devices in the locality. The local wireless network can use any suitable data transmission technology, such as Bluetooth™ wireless point-to-point transmission or WiFi RF transmission. The handwritten electronic messaging of the Originator is sent via the data transmission network to the mobile device of a Receiver which also has a handwriting messaging component for receiving and similarly sending handwritten or hand-drawn messages.

It is envisioned that the handwritten messaging system of the present invention is particularly useful for messaging via mobile game player devices. The use of handwriting and drawings has been a part of game playing since ancient times. Many popular games are based on handwriting and drawings such as Tic Tac Toe, Hangman, and Pictionary®. Other popular pastimes that involve handwriting include coloring pictures and drawing together. The Handwriting Messaging System for Game Devices would allow people from all over the world to use handwriting and drawings to play electronic version of these types of games with each other.

The mobile game player device can be a portable or console-based game player with a network connection (either wireless or wired), video display and pad that allows handwriting input via a stylus. The handwriting system presents an area on the screen display for capturing handwriting via the stylus, digitizes the stylus movements on the pad and transmits the digitized data in an electronic messaging format to one or more player's devices. The transmission may be either point-to-point or through a network server connected to multiple client devices. For point-to-point connection, the handwriting client component operable on one mobile device can establish itself as a wireless hub and send data by wireless transmission within its range to another client component operating on another mobile device. The handwriting client component can send the handwritten electronic message like email which is placed in the receiving "mailbox" of the user, or as "push email" which is notified to the user, or in "instant messaging" format in which the system alerts the recipient that a message has been received and/or automatically displays the handwritten message on the recipient's display screen. Alternatively, the system can be configured where the message display area is used for handwritten "chat" in which one user writes a message that automatically appears on the other user's screen, then the other user can markup the message or write a reply on a scrollable portion of display area, back and forth with each other.

It is understood that many other modifications and variations may be devised given the above description of the principles of the invention. It is intended that all such modifications and variations be considered as within the spirit and scope of this invention, as defined in the following claims.

I claim:

1. A handwritten messaging system operable on mobile devices connected to a data transmission network comprising:
   (a) a server component operable on a server computer connected to a data transmission network for receiving a handwritten message in electronic format sent from a user of a mobile device and delivering the handwritten message in real time to a mobile device of another recipient to whom it is addressed;
   (b) the mobile device having a handwriting messaging component operable with a messaging client of the mobile device having a connection to the data transmission network, wherein said handwriting messaging component sets up a handwriting data capture area within said messaging client into which the user can enter handwritten input through a suitable manual input device, and said handwriting data capture area operates to capture the handwritten input as graphical data and send it as a message in electronic format on the data transmission network; and
   (c) the mobile device being connected to the data transmission network having a messaging client for sending and receiving the handwritten electronic message sent from the mobile device of the user to that of the recipient via the network and for inputting it and then viewing it as a handwritten message via the messaging clients of the respective devices.

2. A handwritten messaging system according to claim 1, wherein the handwriting messaging component is operable for also setting up a graphical data viewing area for viewing handwritten electronic messages sent to the user via the data transmission network.

3. A handwritten messaging system according to claim 1, wherein the handwritten messaging component is a small-footprint software module installed with the messaging client of the mobile device.

4. A handwritten messaging system according to claim 1, wherein the mobile device is a portable game console or game player device.

5. A handwritten messaging system according to claim 1, wherein the mobile device is mobile game player with a wireless connection to a wireless data network.

6. A handwritten messaging system according to claim 1, wherein the handwritten messaging component of the mobile device converts the handwritten input to a graphical data attachment to an email message.

7. A handwritten messaging system according to claim 1, wherein the handwritten messaging component of the mobile device converts the handwritten input to "push email" format wherein the recipient is automatically alerted of receipt of a handwritten message on the recipient's mobile device.

8. A handwritten messaging system operable on mobile devices connected to a data transmission network comprising:
   (a) a server component operable on a server computer connected to a data transmission network for receiving a handwritten message in electronic format sent from a user of a mobile device and delivering it to a mobile device of another recipient to whom it is addressed;
   (b) the mobile device having a handwriting messaging component operable with a messaging client of the mobile device having a connection to the data transmission network, wherein said handwriting messaging component sets up a handwriting data capture area within said messaging client into which the user can enter handwritten input through a suitable manual input device, and said handwriting data capture area operates to capture the handwritten input as graphical data and send it as a message in electronic format on the data transmission network; and
   (c) the mobile device being connected to the data transmission network having a messaging client for sending and receiving the handwritten electronic message sent from the mobile device of the user to that of the recipient via the network and for inputting it and then viewing it as a handwritten message via the messaging clients of the respective devices,
   wherein the handwritten messaging component of the mobile device converts the handwritten input to "instant messaging" format wherein the handwritten message is automatically displayed on the recipient's mobile device.

9. A handwritten messaging system operable on mobile devices connected to a data transmission network comprising:
   (a) a server component operable on a server computer connected to a data transmission network for receiving a handwritten message in electronic format sent from a user of a mobile device and delivering it to a mobile device of another recipient to whom it is addressed;
   (b) the mobile device having a handwriting messaging component operable with a messaging client of the mobile device having a connection to the data transmission network, wherein said handwriting messaging component sets up a handwriting data capture area within said messaging client into which the user can enter handwritten input through a suitable manual input device, and said handwriting data capture area operates to capture the handwritten input as graphical data and send it as a message in electronic format on the data transmission network; and
   (c) the mobile device being connected to the data transmission network having a messaging client for sending and receiving the handwritten electronic message sent from the mobile device of the user to that of the recipient via the network and for inputting it and then viewing it as a handwritten message via the messaging clients of the respective devices, wherein the handwritten messaging component of the mobile device converts the handwritten input to "chat" format in which a handwritten message written by one user is automatically displayed on the other user's screen, then the other user can markup the handwritten message or write a reply on a scrollable portion of data capture area, back and forth with each other.

10. A handwritten messaging system according to claim 9, wherein the handwritten messaging component of the mobile device converts the handwritten input to "chat" format in which each user can write a reply on a scrollable portion of the data capture area, back and forth with each other.

11. A handwritten messaging method for use with mobile devices comprising:
   (a) setting up a data capture area for handwriting input in a display screen for a messaging client of a mobile device of a user (as sender) connected to a data transmission network, and using a manual input device operatively coupled to the handwriting data capture area to enable the sender to enter handwritten input into the handwriting data capture area of the messaging client;
   (b) composing a handwritten message on the mobile device of the sender by entering handwritten manual input with the input device in the handwriting data capture area of the messaging client, capturing the handwritten input as graphical data, and sending it in real time as a handwritten electronic message on the data transmission network to a recipient to whom the handwritten electronic message is addressed; and
   (c) receiving the handwritten electronic message sent from the sender through the data transmission network to a mobile device of the recipient to whom it is addressed,
   wherein the mobile devices are connected to the data transmission network and enable inputting the handwritten message in the mobile device of the user and viewing it as a handwritten message in the mobile device of the recipient via the messaging clients of the respective devices.

12. A handwritten messaging method according to claim 11 further comprising setting up a graphical data viewing area for viewing handwritten electronic messages sent to the mobile device of the user via the data transmission network.

13. A handwritten messaging method according to claim 11, wherein the data capture area is set up by a small-footprint software module installed with the messaging client of the mobile device.

14. A handwritten messaging method according to claim 11, wherein the mobile device is a portable game console or game player device.

15. A handwritten messaging method according to claim 11, wherein the mobile device is mobile game player with a wireless connection to a wireless data network.

16. A handwritten messaging method according to claim 11, wherein the messaging client of the mobile device converts the handwritten input to a graphical data attachment to an email message.

17. A handwritten messaging method according to claim 11, wherein the messaging client of the mobile device converts the handwritten input to "push email" format wherein the recipient is automatically alerted of receipt of a handwritten message on the recipient's mobile device.

18. A handwritten messaging method for use with mobile devices comprising:
   (a) setting up a data capture area for handwriting input in a display screen for a messaging client of a mobile device of a user (as sender) connected to a data transmission network, and using a manual input device operatively coupled to the handwriting data capture area to enable the sender to enter handwritten input into the handwriting data capture area of the messaging client;
   (b) composing a handwritten message on the mobile device of the sender by entering handwritten manual input with the input device in the handwriting data capture area of the messaging client, capturing the handwritten input as graphical data, and sending it as a handwritten electronic message on the data transmission network; and
   (c) receiving the handwritten electronic message sent from the sender through the data transmission network to a mobile device of a recipient to whom it is addressed
   wherein the mobile devices are connected to the data transmission network and enable inputting the handwritten message in the mobile device of the user and viewing it as a handwritten message in the mobile device of the recipient via the messaging clients of the respective devices, and
   the messaging client of the mobile device converts the handwritten input to "instant messaging" format wherein the handwritten message is automatically displayed on the recipient's mobile device.

19. A handwritten messaging method for use with mobile devices comprising:
   (a) setting up a data capture area for handwriting input in a display screen for a messaging client of a mobile device of a user (as sender) connected to a data transmission network, and using a manual input device operatively coupled to the handwriting data capture area to enable the sender to enter handwritten input into the handwriting data capture area of the messaging client;
   (b) composing a handwritten message on the mobile device of the sender by entering handwritten manual input with the input device in the handwriting data capture area of the messaging client, capturing the handwritten input as graphical data, and sending it as a handwritten electronic message on the data transmission network; and
   (c) receiving the handwritten electronic message sent from the sender through the data transmission network to a mobile device of a recipient to whom it is addressed,
   wherein the mobile devices are connected to the data transmission network and enable inputting the handwritten message in the mobile device of the user and viewing it as a handwritten message in the mobile device of the recipient via the messaging clients of the respective devices, and
   the messaging client of the mobile device converts the handwritten input to "chat" format in which a handwritten message written by one user is automatically displayed on the other user's screen, then the other user can markup the handwritten message or write a reply on a scrollable portion of data capture area, back and forth with each other.

20. A handwritten messaging method according to claim 19, wherein the messaging client of the mobile device converts the handwritten input to "chat" format in which each user can write a reply on a scrollable portion of the data capture area, back and forth with each other.

* * * * *